(12) United States Patent
Berliner

(10) Patent No.: US 10,703,602 B2
(45) Date of Patent: Jul. 7, 2020

(54) APPARATUS FOR TORAH SCROLL

(71) Applicant: Moshe Yohanan Berliner, Moshav Meron (IL)

(72) Inventor: Moshe Yohanan Berliner, Moshav Meron (IL)

( * ) Notice: Subject to any disclaimer, the term of this patent is extended or adjusted under 35 U.S.C. 154(b) by 0 days.

(21) Appl. No.: 16/517,605

(22) Filed: Jul. 21, 2019

(65) Prior Publication Data
US 2020/0071119 A1     Mar. 5, 2020

(30) Foreign Application Priority Data
Jul. 30, 2018   (IL) .......................................... 260887

(51) Int. Cl.
| | | |
|---|---|---|
| B65H 75/24 | (2006.01) | |
| G09F 11/29 | (2006.01) | |
| B65H 75/08 | (2006.01) | |
| G09B 29/06 | (2006.01) | |

(52) U.S. Cl.
CPC ............. *B65H 75/24* (2013.01); *B65H 75/08* (2013.01); *G09B 29/06* (2013.01); *G09F 11/29* (2013.01)

(58) Field of Classification Search
CPC ........ B65H 75/24; B65H 75/08; B65H 18/08; B65H 18/02; B65H 18/025; G09B 29/06; G09F 11/29; A47B 81/007
See application file for complete search history.

(56) References Cited

U.S. PATENT DOCUMENTS

| | | | | |
|---|---|---|---|---|
| 247,336 | A * | 9/1881 | Willner ................... | G09F 11/29 40/518 |
| 1,648,998 | A * | 11/1927 | Sherman ................ | B65H 75/08 242/599.2 |
| 2,425,197 | A * | 8/1947 | Montague ............... | G09F 11/29 434/426 |
| 2,523,806 | A * | 9/1950 | Bohne ..................... | A47F 13/04 242/129.51 |
| 5,527,242 | A * | 6/1996 | Gangloff ................ | A63B 1/005 482/104 |
| 5,603,474 | A * | 2/1997 | Weber ..................... | B25H 1/10 248/127 |
| 5,924,869 | A * | 7/1999 | Haas ...................... | A47G 33/00 40/518 |
| 6,581,869 | B2 * | 6/2003 | Arrane ................... | G09B 29/06 242/533.8 |
| 6,609,318 | B2 * | 8/2003 | Augustine ............... | G09F 11/18 40/499 |
| 7,302,772 | B2 * | 12/2007 | Harrington .............. | A47G 1/14 40/358 |
| 7,654,022 | B1 * | 2/2010 | Waldsmith ............. | G09F 11/29 40/385 |
| 8,801,419 | B1 * | 8/2014 | Oskirka ................. | A21C 15/00 211/123 |

(Continued)

*Primary Examiner* — Gary C Hoge
(74) *Attorney, Agent, or Firm* — The Roy Gross Law Firm, LLC; Roy Gross

(57) ABSTRACT

An apparatus for a Torah scroll, the apparatus including two parallel plates, at least a first rail, for sliding the two parallel plates one away from the other, for adjusting the distance therebetween, and depressions in widths of at least one of the two parallel plates disposed at two ends thereof, thereby surfaces of the two parallel plates function as an ark while being disposed near one another, and the depressions function as supports for handles of rollers of a Torah scroll at an open state thereof.

11 Claims, 4 Drawing Sheets

(56) References Cited

U.S. PATENT DOCUMENTS

| | | | |
|---|---|---|---|
| 10,524,566 B2 * | 1/2020 | Brown | A47B 43/00 |
| 2005/0000340 A1 * | 1/2005 | Petersen | B26D 1/025 |
| | | | 83/485 |
| 2007/0195514 A1 * | 8/2007 | Katz | G09F 11/29 |
| | | | 362/97.1 |
| 2008/0308666 A1 * | 12/2008 | Cowdrey | G09F 11/21 |
| | | | 242/528 |
| 2009/0159475 A1 * | 6/2009 | Limber | A47F 7/0028 |
| | | | 206/391 |
| 2014/0299706 A1 * | 10/2014 | DiSabantonio, III | B65D 19/12 |
| | | | 242/598 |

* cited by examiner

APPARATUS FOR TORAH SCROLL

CROSS-REFERENCE TO RELATED APPLICATIONS

This application claims the benefit of priority from Israel Patent Application No. 260,887, filed Jul. 30, 2018, the disclosure of which is incorporated herein by reference.

TECHNICAL FIELD

The invention relates to the field of Judaism and Torah scrolls therefor.

BACKGROUND

Torah scrolls lacking an integral box are damaged easily since the rollers are separated from one another.

There is a long felt need to provide a solution to the above-mentioned and other problems of the prior art.

SUMMARY

An apparatus for a Torah scroll, including:
two parallel plates;
a first rail therebetween; and
depressions in widths of the two parallel plates.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
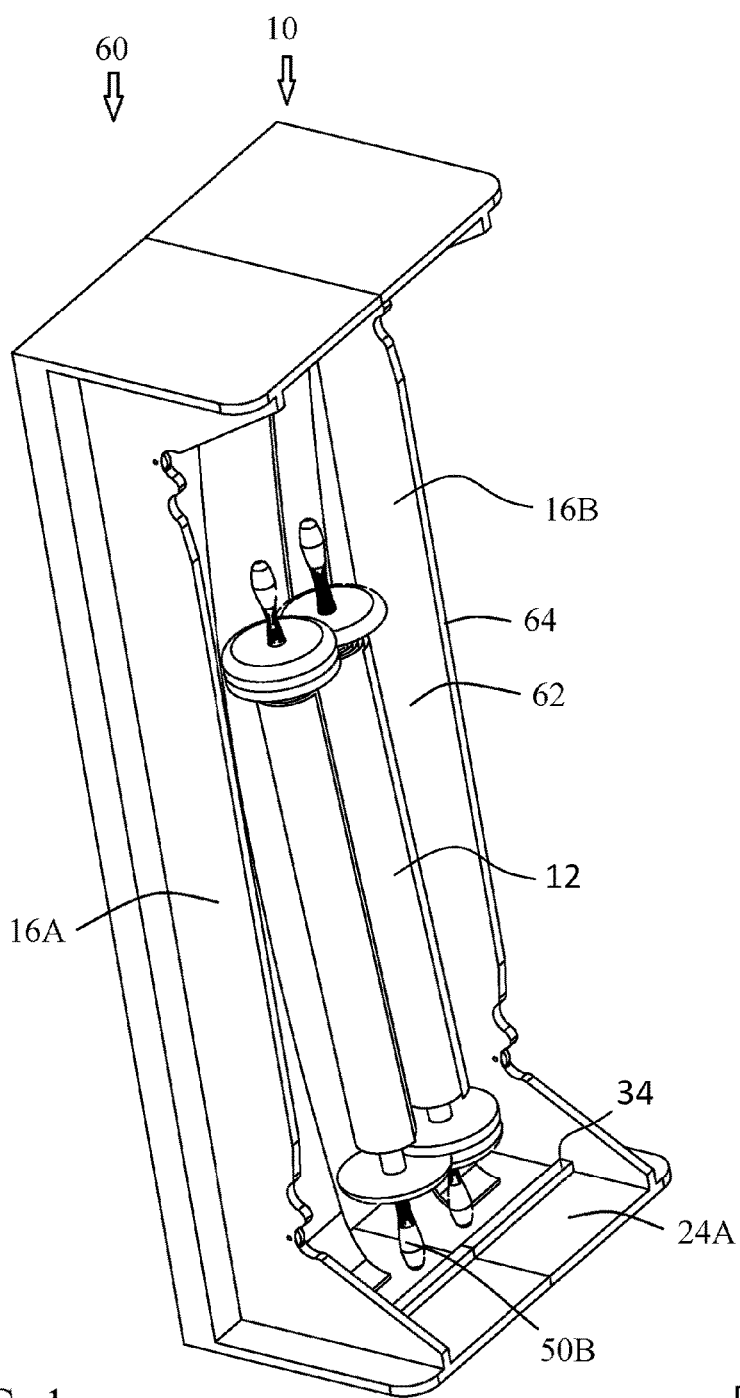
FIG. 1 is a perspective view of a Torah scroll, and an apparatus therefor according to one embodiment of the invention, at the closed state of both.

FIG. 1 is a perspective view of a Torah scroll, and an apparatus therefor according to one embodiment of the invention, at the closed state of both.

An apparatus 10 for a Torah scroll 12 includes two parallel plates 16A and 16B, for disposing Torah scroll 12 erected therebetween at the rolled state, parallel thereto, for avoiding tilt and fall of Torah scroll 12.

Figure 2:
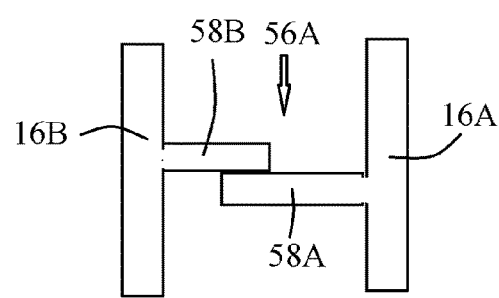
FIG. 2 is a bottom view of the apparatus.

FIG. 2 is a bottom view of the apparatus.

Apparatus 10 further includes a rail 56A for holding plates 16A and 16B in a slideable manner, for changing the distance therebetween. Rail 56A includes a first member 58A fixed to plate 16A and a second member fixed 58B fixed to plate 16B.

Figure 3:
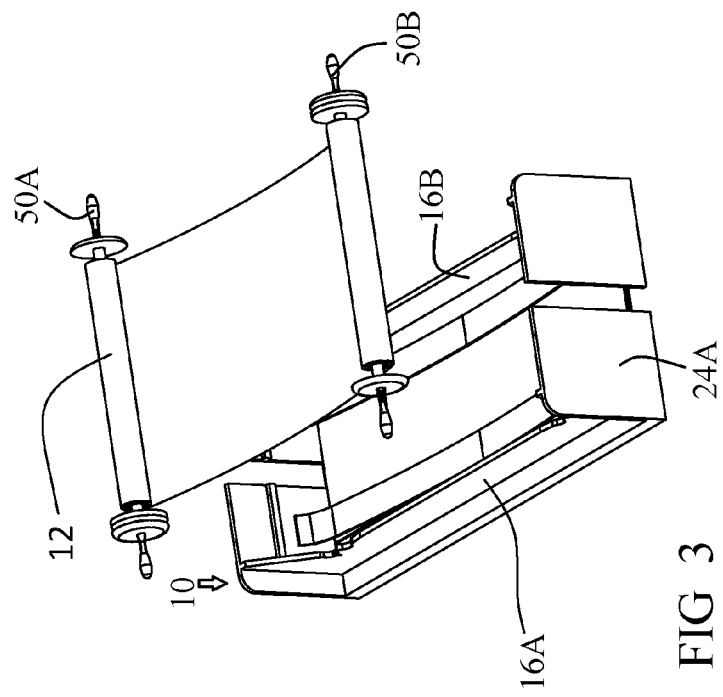
FIG. 3 is a perspective view the Torah scroll, and the apparatus therefor of FIG. 1 at the closed state, upon removing the Torah scroll.

FIG. 3 is a perspective view the Torah scroll, and the apparatus therefor of FIG. 1 at the closed state, upon removing the Torah scroll.

Figure 4:
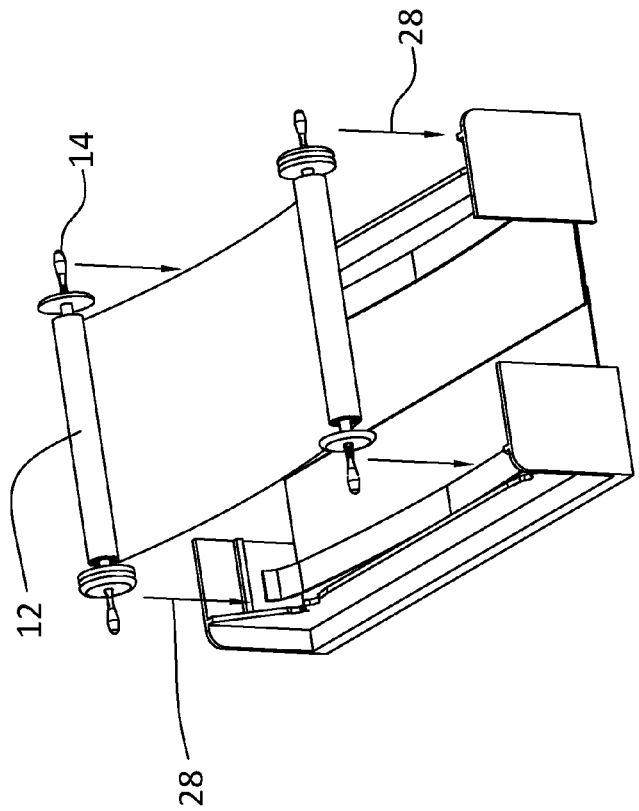
FIG. 4 is a perspective view the Torah scroll, and the apparatus therefor of FIG. 4, at the open state.

FIG. 4 is a perspective view the Torah scroll, and the apparatus therefor of FIG. 4, at the open state.

After removing Torah scroll 12, plates 16A and 16B may be drawn away from one other, by the user, for allowing disposing the rollers 50A and 50B thereon, perpendicular thereto.

Figure 5:
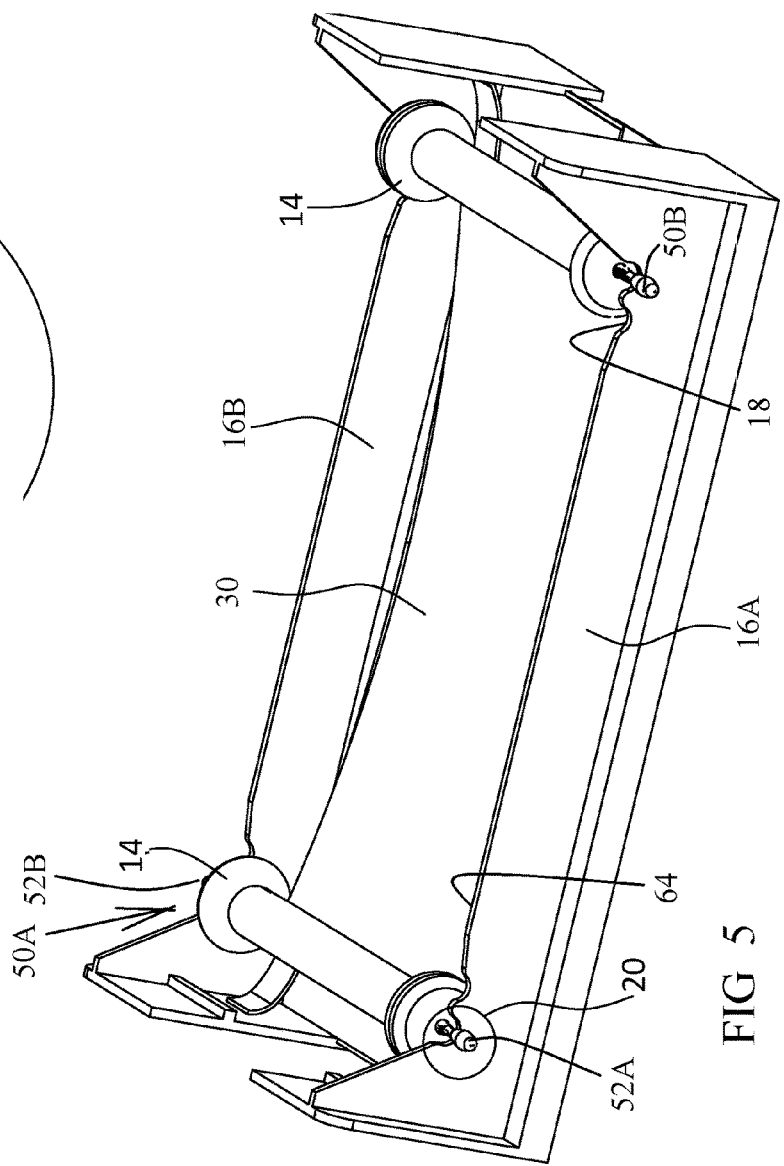
FIG. 5 is a perspective view the apparatus therefor of FIG. 4, at the open state, and the Torah scroll disposed thereon.

FIG. 5 is a perspective view the apparatus therefor of FIG. 4, at the open state, and the Torah scroll disposed thereon.

The selected distance between plates 16A and 16B is intended to be the distance between handles 52A and 52B of roller 50A, for allowing disposing handle 52A of roller 50A on plate 16A and handle 52B of roller 50A on plate 16B.

Preferably, each of plates 16A and 16B includes, at the end thereof, a depression 18 for each handle, for fixing the location of rollers 50A and 50B, thus avoiding fall thereof to the ground.

Figure 6:
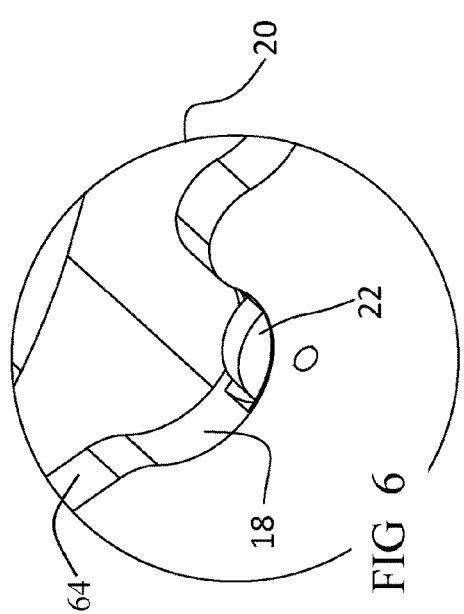
FIG. 6 magnifies one of the depressions of the plates.

FIG. 6 magnifies one of the depressions of the plates.

Depression 18 may include a bearing 22, for facilitating rolling of rollers 50A and 50B about themselves within the depression, for scrolling text sheet 30.

Figure 7:
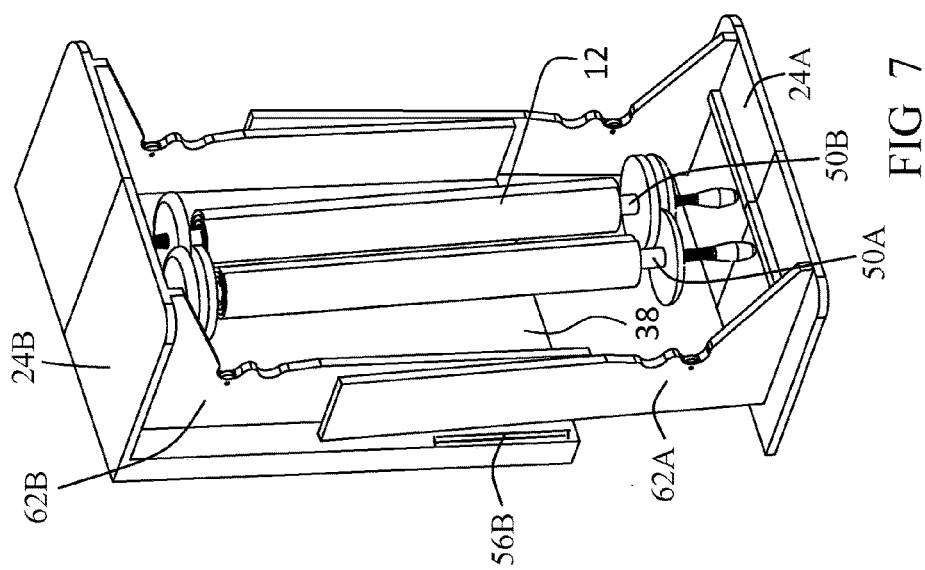
FIG. 7 is a perspective view of the Torah scroll, and the apparatus therefor of FIG. 1 at a diminished state.

FIG. 7 is a perspective view of the Torah scroll, and the apparatus therefor of FIG. 1 at a diminished state.

Apparatus 10 may be diminished in comparison to the state of FIG. 1, or enlarged, for fitting the length of plates 16A and 16B to the length of rollers 50A and 50B, by dividing each of plates 16A and 16B to two subsidiary plates 62A and 62B, which may slide one along the other by a rail 56B therebetween.

Figure 8:
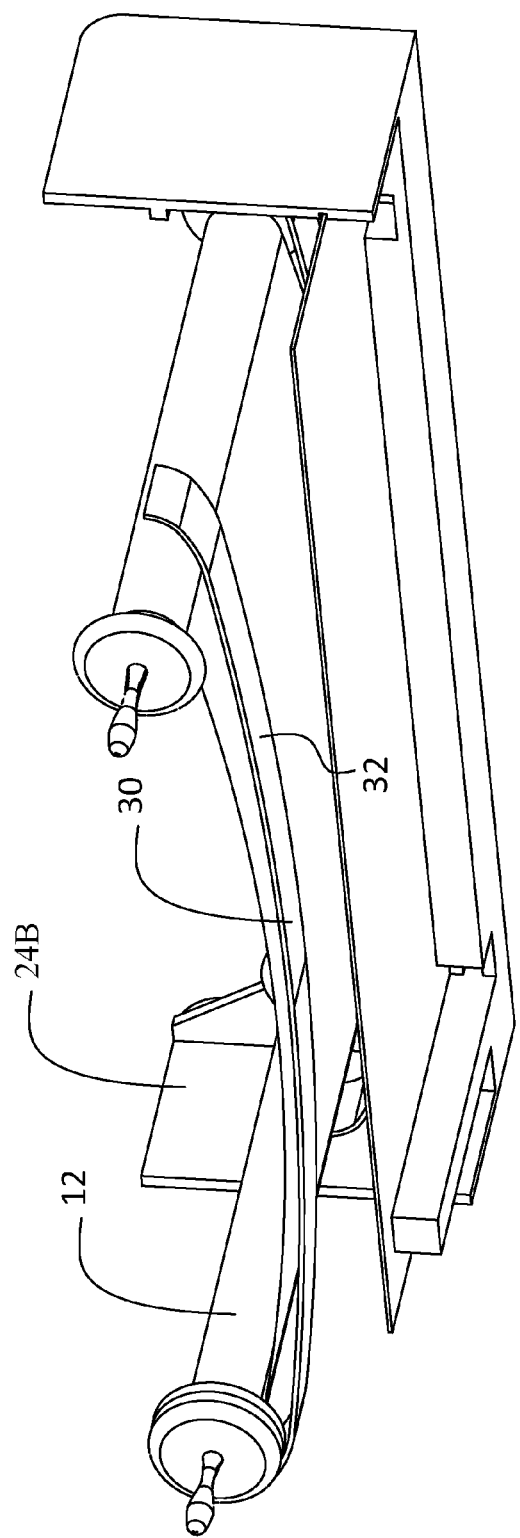
FIG. 8 is a perspective bottom view of the Torah scroll, and the apparatus therefor of FIG. 1.

FIG. 8 is a perspective bottom view of the Torah scroll, and the apparatus therefor of FIG. 1.

Soft straps 32 may raise for supporting text sheet 30, for protecting it.

Thus, in one aspect, the invention is directed to an apparatus (10) for a Torah scroll (12), the apparatus (10) including:
  two parallel plates (16A, 16B);
  at least a first rail (56A), for sliding the two parallel plates (16A, 16B) one away from the other, for adjusting the distance therebetween; and
  depressions (18) in widths (64) of at least one of the two parallel plates (16A, 16B) disposed at two ends thereof,
  thereby surfaces (62) of the two parallel plates (16A, 16B) function as an ark (60) while being disposed near one another, and
  the depressions (18) function as supports for handles (52A) of rollers (50A) of a Torah scroll (12) at an open state thereof.

The apparatus (10) may further include:
  at least one plate (24A) extending perpendicularly from at least one end of the at least one of the two parallel plates (16A, 16B), thereby the at least one plate (24A) forms a base of the ark (60).

At least one of the depressions (18) in the widths (64) of the at least one of the two parallel plates (16A, 16B) includes a bearing (22),
thereby facilitating rolling of the rollers (50A, 50B) about themselves.

Each of the two parallel plates (16A, 16B) may include:
two subsidiary plates (62A, 62B); and
at least a second rail (56B), for sliding the two subsidiary plates (62A, 62B) one away from the other,
thereby allowing adjusting the height of the ark (60).

In the figures and/or description herein, the following reference numerals (Reference Signs List) have been mentioned:
numeral 10 denotes the apparatus for Torah scroll 12 according to one embodiment of the invention;
numeral 12 denotes the Torah scroll;
numeral 14 denotes a circle around the roller of Torah scroll 12, near the handle, for raising the text sheet; this circle may be eliminated in case of using apparatus 10;
numeral 16A and 16B denote the main plates;
numeral 20 denotes a certain portion;
numeral 22 denotes a bearing;
numeral 18 denotes the depression in width 64;
numerals 24A and 24B denote the plates being the base and top respectively of ark 60;
numeral 28 denotes placing of the roller;
numeral 30 denotes the text sheet;
numeral 34 denotes a barrier, being a bar for avoiding slipping of handle 50B;
numerals 50A and 50B denote handles of one roller;
numeral 56A denotes a rail for maintaining rails 16A and 16B parallel to one another while allowing adjusting the distance therebetween;
numeral 56B denotes a rail for adjusting the length of rail 16A or 16B;
numerals 58A and 58B denote members of rail 56A;
numeral 60 denotes the ark, formed by the apparatus;
numeral 62 denotes the surface of the plate; and
numeral 64 denotes the width of the plate.

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. An apparatus for supporting a Torah scroll, said apparatus comprising:
a first plates and a second plate, the first plate and the second plate being parallel to one another and configured to support handles of rollers of a Torah scroll; and
a first rail connected to and extending perpendicularly from the first plate, and a second rail connected to and extending perpendicularly from the second plate;
wherein the first rail and the second rail have exterior surfaces that slide with respect to one another, such that a distance therebetween said two parallel plates is adjustable via the sliding of the first rail and the second rail;
wherein the first rail and the second rail each have at least two depressions disposed at each of the two ends of the first rail and the second rail thereof,
wherein said depressions function as supports for handles of rollers of a Torah scroll at an open state thereof, and are configured to fix the locations the handles of rollers of a Torah scroll for avoiding fall thereof to the ground, and
wherein said first parallel plate and said second parallel plate function as an ark while being disposed near one another.

2. The apparatus of claim 1, further comprising:
at least one plate extending perpendicularly from at least one end of said at least one of said two parallel plates,
thereby said at least one plate comprises a base of said ark.

3. The apparatus of claim 2, wherein the base of said ark includes a flange member that acts as a barrier for preventing the Torah scroll from slipping.

4. The apparatus of claim 2, wherein the barrier is a bar.

5. The apparatus of claim 2, further comprising at least one plate extending perpendicularly from the other end of said at least one of said two parallel plates,
thereby said at least one plate comprises a top of said ark.

6. The apparatus of claim 1, wherein at least one of said depressions comprises a bearing, thereby facilitating rolling of said rollers about themselves.

7. The apparatus of claim 6, wherein the bearing is a wheel.

8. The apparatus of claim 1, wherein each of said two parallel plates comprises:
two subsidiary plates; and
at least a second rail, for sliding said two subsidiary plates one away from the other,
thereby allowing adjusting a height of said ark.

9. The apparatus of claim 1, wherein the first rail and the second rail have two depressions in each end thereof.

10. The apparatus of claim 1, wherein the first rail and the second rail avoid tilt and fall of the Torah scroll.

11. The apparatus of claim 1, wherein the first rail and the second have a closed position whereby the Torah scroll is in a diminished state.

* * * * *